United States Patent
Weingartner

(10) Patent No.: US 8,950,854 B2
(45) Date of Patent: Feb. 10, 2015

(54) METHOD FOR PRODUCING A MULTICOLORED SURFACE ON GLASS

(75) Inventor: Peter Weingartner, Döelsach (AT)

(73) Assignee: Durst Phototechnik Digital Technology GmbH (AT)

( * ) Notice: Subject to any disclaimer, the term of this patent is extended or adjusted under 35 U.S.C. 154(b) by 711 days.

(21) Appl. No.: 13/083,003

(22) Filed: Apr. 8, 2011

(65) Prior Publication Data

US 2011/0249056 A1 Oct. 13, 2011

(30) Foreign Application Priority Data

Apr. 9, 2010 (AT) ................................. A 573/2010

(51) Int. Cl.
C09D 11/00 (2014.01)
B41M 5/00 (2006.01)
C09D 5/29 (2006.01)
C09D 11/322 (2014.01)
B41M 7/00 (2006.01)
B41J 3/407 (2006.01)
B41J 11/00 (2006.01)
B41M 3/00 (2006.01)

(52) U.S. Cl.
CPC .............. B41M 5/0047 (2013.01); B41M 5/007 (2013.01); C09D 5/29 (2013.01); C09D 11/322 (2013.01); B41M 7/009 (2013.01); *B41J 3/407* (2013.01); *B41J 11/002* (2013.01); *B41M 3/008* (2013.01); *B41M 5/0011* (2013.01); *B41M 7/0072* (2013.01)
USPC ......................................................... 347/100

(58) Field of Classification Search
CPC ...... C09D 11/30; C09D 11/38; C09D 11/328; C09D 11/40; B41J 2/01; B41J 11/002; B41J 3/407; B41M 3/008; B41M 5/0011; B41M 4/0047
USPC .......................................................... 347/100
See application file for complete search history.

(56) References Cited

U.S. PATENT DOCUMENTS

| 6,336,723 | B1 | 1/2002 | Nicolin |
| 2004/0160500 | A1 | 8/2004 | Itoh et al. |
| 2005/0057630 | A1* | 3/2005 | Hiroki et al. ................... 347/100 |
| 2005/0230969 | A1* | 10/2005 | Smith, III ...................... 285/108 |
| 2008/0176001 | A1* | 7/2008 | Vasudevan ..................... 427/466 |

FOREIGN PATENT DOCUMENTS

| DE | 102007036739 A1 | 2/2009 |
| EP | 2053100 A1 | 4/2009 |
| EP | 2292430 A1 | 3/2011 |
| EP | 2335940 A1 | 6/2011 |
| JP | 2004263176 A | 9/2004 |
| WO | 2009157262 A1 | 12/2009 |

OTHER PUBLICATIONS

Japanese Office Action for Application No. 2011-086416 dated Oct. 7, 2014.

* cited by examiner

Primary Examiner — Laura Martin
(74) Attorney, Agent, or Firm — Lerner, David, Littenberg, Krumholz & Mentlik, LLP

(57) ABSTRACT

The invention relates to a method for producing a multicolored surface on a ceramic element or glass by means of the drop-like application of variously colored primary ceramic process color inks containing a carrier fluid onto at least one portion of a surface of the ceramic element or glass, wherein mixed colors are produced by printing on top of one another at least two primary process color inks, and the subsequent firing of the applied ink drops. At least one (photo)oligomerizable or (photo)polymerizable additive is added to the primary ceramic process color inks. Prior to printing over an ink drop with another ink drop the ink drop is hardened at least partly or its viscosity is increased.

10 Claims, 3 Drawing Sheets

METHOD FOR PRODUCING A MULTICOLORED SURFACE ON GLASS

BACKGROUND OF THE INVENTION

The invention relates to a method for producing a multicolored surface on a ceramic element or glass by the drop-like application of differently colored primary ceramic process color inks containing a carrier fluid onto at least part of a surface of the ceramic element or glass, whereby mixed colors are produced by printing on top of one another at least two primary process color inks, and subsequently firing the applied ink drops, a printing ink system consisting of several differently colored, primary ceramic process color inks, from which mixed colors can be produced by printing on top of one another at least two primary ceramic process color inks, wherein each of the primary ceramic process color inks comprises at least one inorganic pigment, a frit, a dispersing agent and an in particular organic carrier fluid and a device for producing a multicolored surface on a ceramic element or glass by the drop-like application of variously colored, primary ceramic process color inks onto at least one portion of a surface of the ceramic element or glass, wherein mixed colors are produced by printing on top of one another at least two primary process color inks, comprising several delivery elements for the process color inks and a support device for depositing the ceramic element or glass during the application of the process color inks.

Particularly high demands are made on the decorative glass in facades in relation to sun radiation and durability. This has been solved in the past largely by using colored glass or by a screen printing method using ceramic inks.

Screen printing has the disadvantage that after the application of one color and before the application of the next color, resulting in a mixed color, the color applied first has to be completely dried (tempered) in a through oven, in order to be able to apply the next color without running. Screen printing also has the disadvantage that for each color and each decoration a separate screen has to be set up. In addition, screen printing inks have the disadvantage of being completely opaque and not transparent.

U.S. Pat. No. 6,336,723 B1 describes a method for producing glass substrates with patterns on a color base. In this case the desired pattern starting with a template, which is produced in any colors on any carrier and is prepared electronically by means of image processing, is printed by an inkjet printer with four colors onto the glass and the colors are then fired. The colors used for firing on glass at about 500° C. to 700° C. are suitable, conventional firing colors with inorganic pigments. The latter are diluted by a diluent to the extent that the application of color is possible with inkjet printers. After the printing and before the firing the glass discs are stored in a horizontal position until the color application has largely dried.

BRIEF SUMMARY OF THE INVENTION

The objective of the present invention is to create a better way of producing a colored glass surface by using few process colors.

Said objective of the invention is achieved independently respectively in that according to the aforementioned method at least one (photo)oligomerizable or (photo)polymerizable additive and possibly at least one photoinitiator is added to the primary ceramic process color inks and prior to printing over an ink drop with an additional ink drop the ink drop is at least partly set and/or after the application of an ink drop of a process color ink and before an additional ink drop of a process color ink is applied onto said first ink drop, the viscosity of the previously applied ink drop is increased so that with the aforementioned printing ink system each of the primary ceramic process color inks contains at least one (photo) oligomerizable or (photo)polymerizable additive and possibly at least one photoinitiator and in the aforementioned device on or adjacent to the delivery elements or a group of delivery elements a light source is arranged and/or the delivery elements are arranged in several print heads and a heating device is arranged between the print heads.

It is an advantage that the individual ink drops after application onto the respective surface are fixed, before said drops are printed over by the next ink drop. In this way it is achieved that the individual ink drops do not flow apart from one another, whereby the sharpness of the image can be increased significantly and the color precision can be improved, in that only the desired mixed colors are generated and mixed colors, which could be created from dissolving the ink drops and the partial mixing with adjacent drops, are prevented. It is also advantageous that although the viscosity of the ink drop is increased to the extent that the running of the colors is avoided, the ink drop still retains a certain amount of residual fluidity, which makes it possible for the additional ink drop applied onto to said ink drops to mix at least partly with the latter, in particular as thereby also carrier fluid is applied into the region of the ink drop, and thus the formation of mixed colors is facilitated and supported.

The (photo)oligomerizable or (photo)polymerizable additive of the ink drop can be in particular only partly oligomerized or polymerized before the application of an additional ink drop thereon, preferably if also a portion of the carrier fluid is removed, in order to increase the viscosity of the ink drop. It is an advantage in this case that the chemical reaction takes place relatively rapidly, whereby the ink drop is fixed rapidly, whereby however by avoiding the complete reaction or by controlling the admixture amount of the additive the desired residual fluidity of the ink drop is retained. In particular, the oligomerization or polymerization can be controlled more effectively with respect to the very small ink drops, as the energy transfer for oligomerization or polymerization can be performed very precisely e.g. by means of light conductors.

For the reasons given above it is an advantage if the (photo) oligomerizable or (photo)polymerizable additive is oligomerized or polymerized by a maximum of 90%, in particular a maximum of 80%, preferably a maximum of 70%.

Furthermore, it is provided for the above reasons that a proportion of the carrier fluid from a maximum of 20%, in particular a maximum of 25%, preferably a maximum of 30%, relative to the total proportion of carrier fluid on the ink drop, is removed, before the next ink drop is applied onto said drop.

A simple and inexpensive option is provided if an oligomerizable or polymerizable carrier fluid is used, which in this case forms the aforementioned additive, and after the application of an ink drop is oligomerized or polymerized in the ink drop. The oligomerization or polymerization can be performed by various different mechanisms, for example by means of electromagnetic radiation by the effect of temperature, whereby in this case at the same time a proportion of carrier fluid can be damped, by reaction with humidity, etc.

According to one embodiment variant of the method, the ceramic element or the glass is printed in a single pass through a printing device, whereby in the printing device several delivery elements for one of the primary ceramic process color inks are arranged behind one another—as viewed in the advancing direction of the ceramic element or glass, and whereby a carrier fluid of the primary ceramic process color inks is removed at least partly from the applied ink drop, before an additional ink drop is applied on the same spot. In this way, the fixing of the individual ink drops is improved, in that the viscosity of the ink drops is increased after application onto the surface, so that the printing of the substrate can also be performed in the so-called single pass method, whereby the efficiency of the method can be increased, even when only small or very small production series are produced.

In the preferred embodiment of the device a heating device is arranged between the print heads.

The evaporation of the carrier fluid can be supported in that for at least two of the primary ceramic process color inks respectively a carrier fluid is used, which can evaporate at different temperatures. In this case it is an advantage, if the carrier fluid with the higher boiling point, i.e. the carrier fluid which can be evaporated at a higher temperature (considered in relation to the additional carrier fluid) is added to the process color ink, which is applied first onto the surface of the substrate, as in this case the first drop is sufficiently fixed, but owing to the later at least partial evaporation of the carrier fluid the additional ink drop printed onto said ink drop can mix with the first ink drop to a certain extent, whereby the later formation of the mixed color is supported. Furthermore, the first ink drop in advance direction runs over a longer path, over which the evaporation of the carrier fluid with the higher boiling point is further continued, so that during the firing of the inks following the printing the formation of bubbles on the color surface is avoided. For this reason, it is also an advantage if the color ink applied last comprises a carrier fluid with a lower boiling point. In the preferred embodiment, the inks applied behind one another (considered in advance direction of the substrate) comprise carrier fluids, the boiling points of which decrease.

The printing ink system can also be designed such that the carrier fluids of at least two primary ceramic process color inks have a different boiling point from one another.

According to one variant of this method a carrier fluid is used, which consists of a mixture of fluids with different boiling points. It is thereby also achieved that the viscosity of the printing inks after application is increased by removing a portion of the carrier fluid, whereby the fixing of the ink drops is supported. Over the distance of the advance of the substrate during the printing it is possible that also the higher boiling components of the carrier fluid are removed at least partly, whereby also the formation of bubbles can be prevented. However, at the same time in the region of an ink drop by means of the still existing carrier fluid portion a specific mixture can be achieved with the additional ink drops applied onto said ink drop, without the ink drop or ink drops flowing into the neighboring drops.

The printing ink system can also be designed such that the carrier fluids of the primary ceramic process color inks consist of a mixture of fluids with different boiling points.

Particularly preferably, the method is performed in that the ceramic element or glass is printed by an inkjet printer, which is why the device according to the invention is designed as an inkjet printer.

According to one embodiment variant of the printing ink system, the total proportion of (photo)oligomerizable or (photo)polymerizable additives on the respective primary ceramic process color ink is selected from an range with a lower limit of 5 wt.-% and an upper limit of 70 wt.-%. With a proportion of (photo)oligomerizable or (photo)polymerizable additives of below 5 wt.-% the ink drops could in fact be fixed, however it has been shown that the quality of the printing is significantly better from the given lower limit. Above the given limit it has been observed that the individual drops become too hard, which affects the latter mixing procedure during the firing to achieve the mixed colors.

It is thus possible within the scope of the invention, that the total proportion of (photo)oligomerizable or (photo)polymerizable additives on the respective primary ceramic process color ink is selected from a range with a lower limit of 5 wt. % and an upper limit of 40 wt. %, or from a range with a lower limit of 10 wt. % and an upper limit of 25 wt. %. In this way the aforementioned effects are improved further.

According to another embodiment variant of the printing ink system for the same reasons given above the total proportion of photoinitiators in the respective primary ceramic process color ink is selected from a range with a lower limit of 0.5 wt. % and an upper limit of 20 wt. %.

It is thus possible within the scope of the invention that the total proportion of photoinitiators in the respective primary ceramic process color ink is selected from a range with a lower limit of 1 wt. % and an upper limit of 10 wt. %, or from a range with a lower limit of 3 wt. % and an upper limit of 7 wt. %. In this way the aforementioned effects are improved further.

The term "photoinitiator" also includes within the scope of the invention IR-initiators, whereby it is an advantage in this case if the proportion of IR initiator or initiators is selected from a range with a lower limit of 0.5 wt. % and an upper limit of 15 wt. %

To facilitate the evaporation of the carrier fluid the proportion of carrier fluid in the primary ceramic process color inks is selected from a range with a lower limit of 30 wt. % and an upper limit of 90 wt. %, or preferably from a range with a lower limit of 40 wt. % and an upper limit of 80 wt. %, in particular from a range with a lower limit of 60 wt. % and an upper limit of 80 wt. %.

According to another embodiment variant of the printing ink system, at least two of the primary ceramic process color inks comprise a different proportion of carrier fluid. In particular, the proportion of carrier fluid in the printing ink applied later is lower. It is also achieved in this way that the proportion of carrier fluid is reduced during the printing process, so far that the formation of bubbles is prevented during the firing of the colors. Preferably, the ink applied last contains the lowest proportion of carrier fluid, the one applied first contains the greatest proportion. Printing inks applied in between the latter contain a lower proportion of carrier fluid than the printing ink applied immediately before this.

For a better understanding of the invention the latter is explained in more detail with reference to the following Figures.

BRIEF DESCRIPTION OF THE DRAWINGS

In a schematically simplified representation.

DETAILED DESCRIPTION

First of all, it should be noted that details relating to position used in the description, such as e.g. top, bottom, side etc. relate to the currently described and represented figure and in case of a change in position should be adjusted to the new position. Furthermore, also individual features or combinations of features from the shown and described exemplary embodiments can represent in themselves independent solutions according to the invention.

Figure 1:
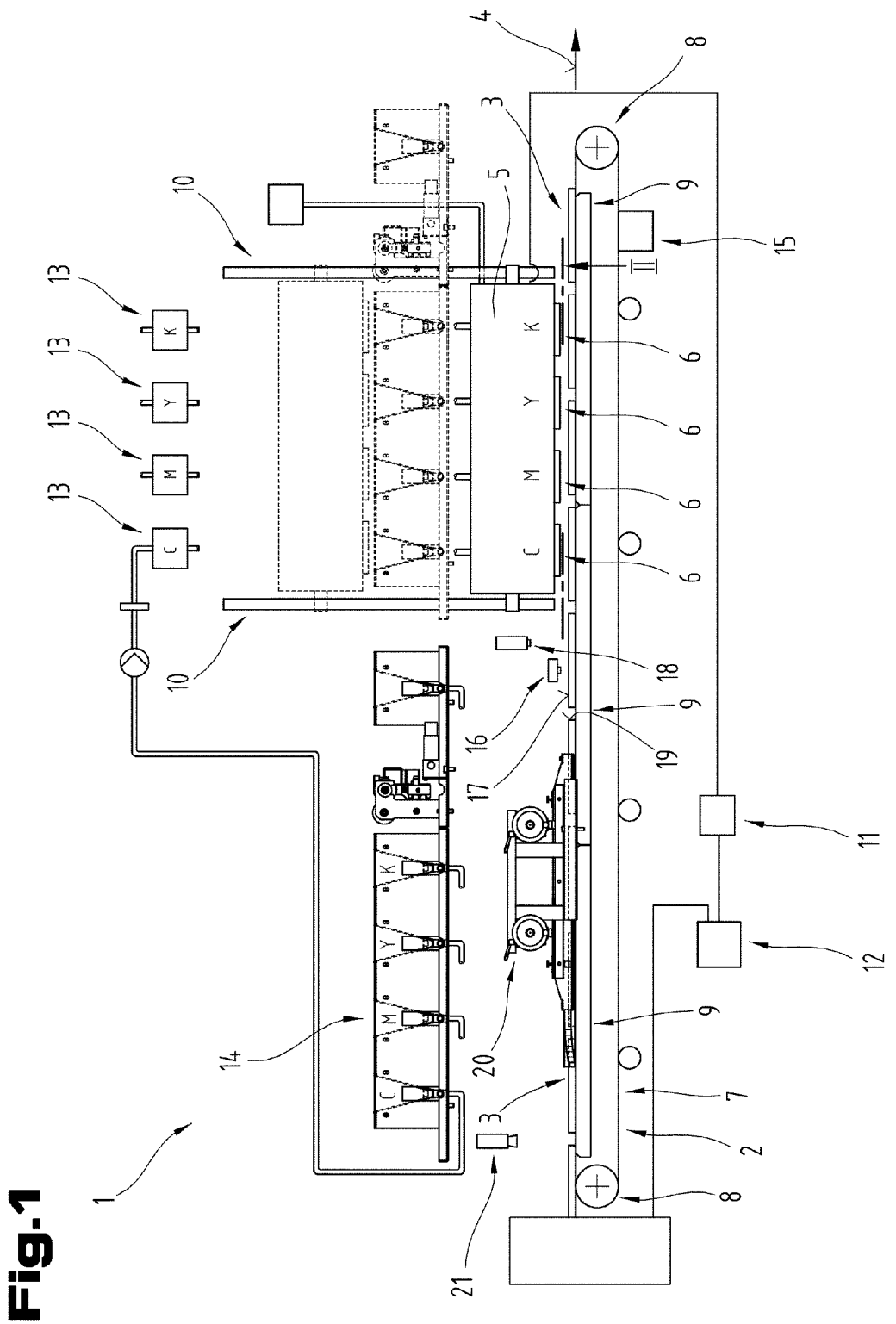
FIG. 1 shows an embodiment variant of a device according to the invention in the form of an inkjet printing device.

FIG. 1 shows an overview of the device 1 in the form of an inkjet printer with schematically simplified representations of individual components.

The device 1 comprises an essentially horizontally arranged transport device 2 for moving print members 3 to be printed lying thereon in an advancing direction 4 (in FIG. 1 from left to right). By means of the transport device 2 there is a print head arrangement 5 with print heads 6, by means of which the print members 3 moved past underneath are printed with ink.

The transport device 2 is preferably formed by a continuous conveyor belt 7, which is guided over at least two guiding rollers 8 and at least one guiding roller 8 is driven. The upper section of the conveyor belt 7 moved in the advancing direction 4 is supported by one or more guiding plates 9 on its lower side. Since the conveyor belt 7 is pulled in a sliding manner over the horizontally and aligned guiding plates 9, a suitably even horizontal movement of the print members 3 is achieved in advancing direction 4.

The print head arrangement 5 comprises for each color a plurality of print heads 6, so that preferably the total width of the printing medium or the print members can be printed at once, without the print head arrangement 5 having to move sideways relative to the advancing direction 4. This means that the print head arrangement 5 is arranged to be fixed in lateral direction. By means of vertically aligned guides 10 the print head arrangement 5 can be lowered in the direction of the conveyor belt 7 or removed from the latter by lifting therefrom.

To control the print heads 6 of the print head arrangement 5 the image data of a pattern to be printed are converted by an image computer 11 into control signals for the print heads 6. To control the entire inkjet printing device a control device 12 is also provided. The control device 12 comprises software for controlling the inkjet printing device, and also the image computer 11 has software for image data processing.

According to this exemplary embodiment color patterns are printed in the colors cyan, magenta, yellow and white or black and the print heads 6 or the print head arrangement 5 are supplied with ink from corresponding tanks 13.

The device 1 can also comprise a nozzle rinsing device 14, which after lifting the print head arrangement 5 can be displaced from a park position below the print head arrangement 5 (shown by a dashed line). To release any possible blockages in the nozzles of the print heads 6 in this way ink can be pushed through all nozzles which are included in the nozzle rinsing device 14.

Preferably, in the region of the lower section of the conveyor belt 7 which is moved against the advancing direction 4, a cleaning device 15 can be arranged for cleaning the conveyor belt 7. Thus ink residues on the conveyor belt 7 can be removed. The cleaning with the cleaning device 15 can be performed for example by scraping off or suctioning off not yet dried on ink residues. The cleaning effect can also be supported by spraying the conveyor belt with a cleaning agent and in this way dried on ink residue can be removed.

By means of a sensor 16 the vertical position of an upper side 17 of the print member 3 or the thickness of the print member 3 are detected, so that by means of the control device 12 the vertical position of the print head arrangement or the spacing of the print head arrangement 5 from the upper side 17 of the print element 3 can be adjusted automatically. An additional sensor 18, which can also be arranged on the input-side area of the transport device 2 in front of the print head arrangement 5, can be provided, in order to detect a front edge 19 of a print member 3, so that the printing procedure of the print head arrangement 5 can be started at the correct time.

In the input area of the transport device 2 there can also be a device 20 for correcting the position of the print members 3, by means of which the print members 3 can be brought onto the conveyor belt 7 in a defined position. Alternatively to this a camera 21 can also be provided, by means of which in connection with automatic image recognition the position and the alignment of the print member 3 lying on the conveyor belt 7 is detected and this information is taken into consideration during the calculation of the image data by the image computer 11.

Figure 2:
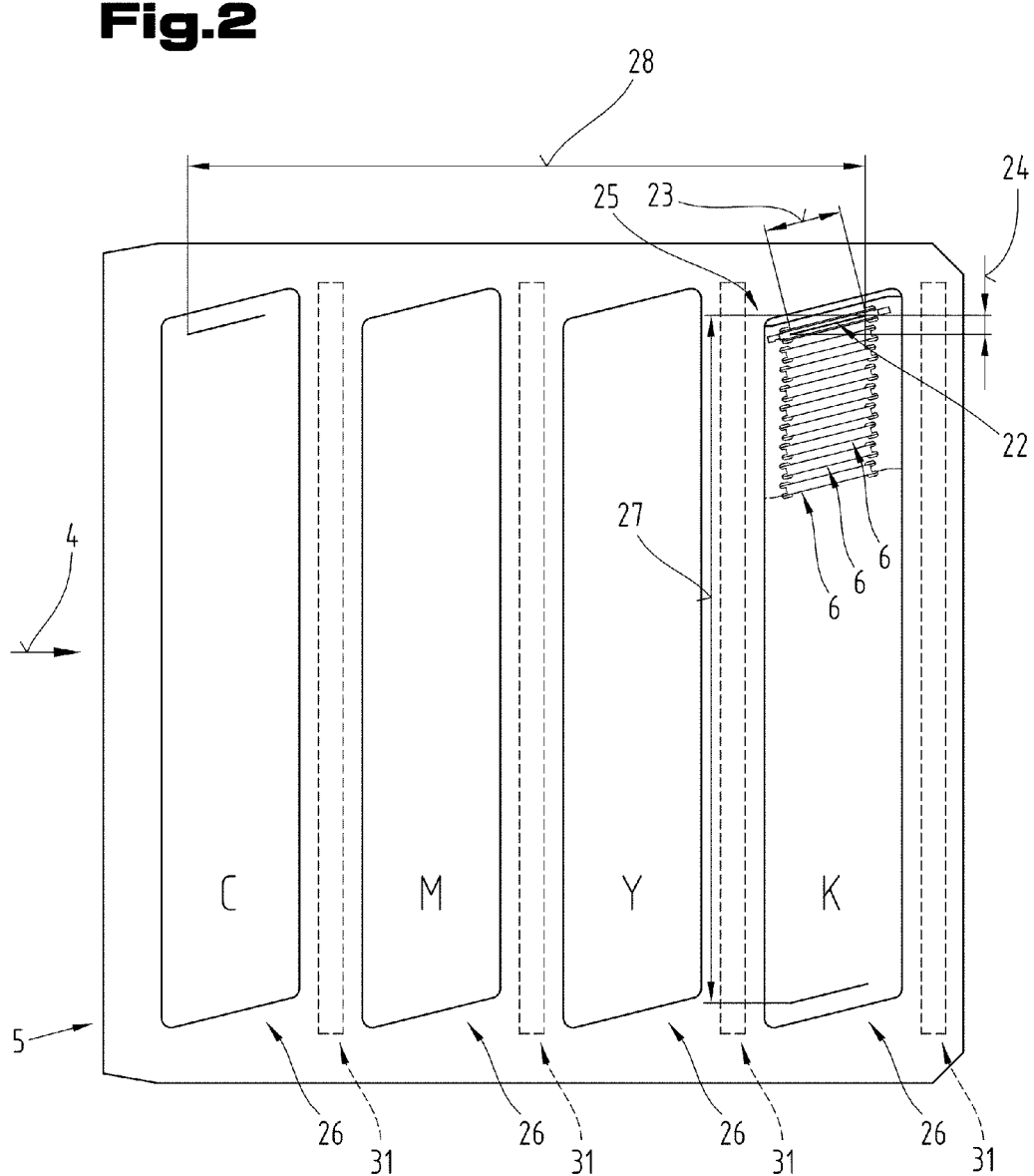
FIG. 2 shows the lower side of a print head arrangement with print heads arranged therein.

FIG. 2 shows the lower side of the print head arrangement 5 according to FIG. 1, with the print heads 6 arranged therein.

Each of the print heads 6 comprises a row of nozzles with a nozzle row length 23 formed by a plurality of adjacent and linearly designed nozzles. The print heads 6 or their rows of nozzles 22 are arranged obliquely or inclined relative to the advancing direction 4, so that each of the rows of nozzles 22 has a printing area width 24 of the row of nozzles 22 perpendicular to the advancing direction 4, which is smaller than the nozzle row lengths 23. Thus by using print heads 6 with a low resolution or a low density of nozzles in the row of nozzles 22 a much higher resolution can be achieved relative to the direction perpendicular to the advancing direction 4.

Without restricting the universality in the described embodiment nine print heads 6 can be combined into a print head module 25 (for a better overview in FIG. 2 only one such print head module 25 is shown). Several such print head modules 25 (in the described embodiment four print head modules 25) together form a row of print heads 26 for printing one of the colors to be printed respectively. The print heads 6 are arranged so that the printing area widths 24 of the rows of nozzles 22 of two adjacent rows of nozzles 22 adjoin one another without a gap, so that the total printing area width 27 of the print head row 26 is established according to the number of print heads 6.

For each of the colors to be printed a row of print heads 26 is provided. According to this exemplary embodiment rows of print heads 26 are arranged behind one another in relation to the advance direction 4 and the nozzles of the print head rows 26 thus extend over a printing area length 28.

In the described embodiment preferably piezo inkjet print heads are used for the print heads 6 and thus printing area widths 27 of more than 50 cm can be achieved, whereby resolutions are possible of in the range of 200 to 800 dpi.

Such inkjet printers for industrial applications are already found in the prior art. For example such an inkjet printer is described in WO 2006/084614 A2 of the applicant, which to this extent is part of the present description. Of course, modifications to this device 1 are possible as described. For example, in place of the transport device 2 described as the conveyor belt only one support device can be arranged for depositing the print member 3 or the print members 3. It is also possible that the print head 6 or the print heads 6 or the print head arrangement 5 is mounted displaceably relative to the print member 3 by means of a corresponding guiding device. This displaceability of the print head arrangement 5 can be provided in the xy-plane in x-direction, i.e. in advancing direction 4 according to FIG. 1, and/or in y-direction, i.e. perpendicular to the advancing direction 4. In the latter case it is not necessary for the print head arrangement 5 to be designed to extend over the entire width of the print members 3 or the support device. Furthermore, not all of the components of the described device 1 have to be provided. For example the nozzle rinsing device 14 and/or the cleaning device 15 or the sensors 16, 18, etc. can be omitted.

It is also possible that more than four print heads or print head arrangements 5 are provided in order for example to process more than four base colors, i.e. more than four process color inks. For example 5, 6, 7 or 8 such print head elements can be arranged—as shown in advancing direction 4.

Furthermore, individual parts of the inkjet printing device according to FIG. 1 can be combined, for example the image computer 11 and the control device 12 form a joint component.

It is also not absolutely necessary, although advantageous, that the rows of nozzles are arranged obliquely to the advancing direction 4.

Furthermore, by arranging a suitable number of nozzles also a higher resolution than the one described can be achieved. Similarly, different piezo inkjet print heads can be used than the ones described, for example so-called valve-jet drives, electrostatic, thermal, acoustic drives etc. for delivering the ink drops.

According to the invention by means of the method on a ceramic element or glass the drop-like application of differently colored primary ceramic process color inks containing a carrier fluid is possible on at least one part of a surface of the ceramic element or glass, whereby mixed colors are produced by printing on top of one another at least two primary process color inks and subsequently firing the applied ink drops, print layers or color layers.

The term "process color ink" within the meaning of the invention includes color inks, which only cover a part of the visible color spectrum, whereby the remaining part of the visible color spectrum or at least part of the latter are produced by mixing several, i.e. at least two process color inks after printing the latter onto the substrate. This is a system of primary colors, such as for example cyan, magenta, yellow and black, whereby also other, additional primary colors can be used such as e.g. white. Within the scope of the invention the respective mixed color tone is not produced by the prior mixing of primary colors to produce the mixed color and the subsequent application of the mixed color onto the ceramic element or glass.

The printing of ceramic surfaces or glass is performed for a variety of different reasons. Firstly, the reasons may be purely aesthetic, such as for example printing said surfaces with motifs, whereby also photos can be transferred onto said surfaces, secondly however also functional surfaces can be produced, for example protective layers on glass surfaces against incidental sunlight, in order to avoid overheating the space behind. In particular, such ceramic elements or glass elements are used in the creation of facades. However, also other uses are possible within the scope of the invention, for example printing on the glass of motor vehicles etc. It is also not absolutely necessary for the print members 3, i.e. the ceramic elements or the glass, to be planar, similarly curved surfaces can be printed by means of the method according to the invention.

In earlier methods for printing ceramic surfaces or glass surfaces, in particular using inkjet printers, there was a problem in that the applied color droplet owing to the smooth surface of the substrate would run after printing and it was more difficult to form high quality printed images. To avoid this, it is possible within the scope of the invention that at least one (photo)oligomerizable or (photo)polymerizable additive and if necessary at least one photoinitiator is added to the primary ceramic process color inks. Before an additional color droplet is applied onto said color drop the first color drop is at least partly set. Alternatively or additionally thereto, it is possible that after the application of an ink drop of a process color ink and before an additional ink drop of a process color ink is applied onto the first ink drop to produce a mixed color, the viscosity of the previously applied ink drop is increased, in order in this way to avoid the running of the ink drop after application on the smooth surface of the ceramic element or glass at least to a large extent.

The ceramic process color inks contain in addition to the (photo)oligomerizable or (photo)polymerizable additives further additives corresponding to the prior art. Usually, the latter consist of a mixture of inorganic pigments, such as e.g. metal oxides of chromium, iron, copper, cobalt, nickel, titanium, aluminum, zinc, chromates, etc., dispersing agents, such as e.g. (poly)ethylene glycols and compounds derived therefrom, (poly)propylene glycols and compounds derived therefrom, glycerin and compounds derived therefrom, fatty acid esters, etc. and various auxiliary substances, such as e.g. viscosity regulators, defoaming agents, surfactants and additives for controlling the drop form in the inkjet-process. Furthermore, e.g. long-chain hydrocarbons (e.g. octacosane, tetracosane, pentacosane, heneicosane, pentadecane, decane, etc.), alcohols (such as e.g. propanediol, etc.) and other organic compounds (e.g. cyclohexanone, cyclopentanone, butanone, etc.) can be part of the carrier fluid. The proportion of inorganic pigments can be selected from a range of 5 wt. % to 40 wt. %, the proportion of dispersing agent and any additional carrier fluids can be selected from a range of 30 wt. % to 90 wt. %.

Preferably, the inorganic pigments with a particle diameter of below 550 nm, in particular below 400 nm are processed. Occasionally, also larger inorganic pigments are used with particle diameters of 1,000 nm to 2,000 nm, in case owing to heavier grinding the color properties of the pigments are weakened.

After the process color inks have been fired to produce the finished printed surface and thus essentially produce a "glaze", said process color inks also contain so-called "frits", which comprise for example an oxide from the group comprising silicon, zinc, bismuth, lead, titanium, zirconium, sodium, potassium, boron, lithium, calcium, aluminum, tin, vanadium, magnesium, etc., or mixtures thereof. The proportion of frits in the process color ink can be selected from a range with a lower limit of 5 wt. % and an upper limit of 80 wt. %, relative to the proportion of solids in the process color ink.

Likewise, functionalized frits can be used, i.e. e.g. oxides from a group comprising silicon, zinc, bismuth, lead, titanium, zirconium, sodium, potassium, boron, lithium, calcium, aluminum, tin, vanadium, magnesium, etc., or mixtures thereof, the surfaces of which have been provided with a (photo)oligomerizable or (photo)polymerizable functionality.

By means of adding the (photo)oligomerizable or (photo)polymerizable additive it is possible to fix the respective ink drop by chain extension of the molecules of the additive. The additive itself can in this case be in the form of monomers or even in the form of dimerers or trimerers etc., whereby in the latter case the fixing can be performed more rapidly, as a greater chain length can be achieved in a shorter time. It should however be noted that the viscosity of the ink should not be too high, to ensure that the latter can still be processed by an inkjet printer.

However, it is also possible to shorten the time until the ink drop is fixed onto the surface of the ceramic element or glass to add to the respective process color ink at least one photoinitiator or photoinitiator mixture. Examples of photoinitiators are various different phenones (e.g. various acetophenones, 2-hydroxy-2-methyl propiophenones, various benzophenones, etc.), Irgacure®, various benzoins, etc., which are known from the prior art and can be obtained from numerous commercial suppliers (e.g. Sigma-Aldrich).

Alternatively, it is also possible to achieve the same effect by the addition of thermal initiators or mixtures thereof. Examples of IR initiators are azobisisobutyronitrile, 1,1'-azobis(cyclohexanecarbonitrile), t-butyl hydroperoxide, m-chloroperbenzoic acid, dibenzoyl peroxide, di-t-butyl peroxide etc. which are also known from the prior art and can be obtained from commercial suppliers (e.g. Sigma-Aldrich).

The initiation of the chain-lengthening reaction of the additive or at least part of the additive—the additive does not need to consist completely of the (photo)oligomerizable or (photo)polymerizable additive, for example proportions of 30 wt. % to 90 wt. % of the additive are formed by a (photo)oligomerizable or (photo)polymerizable additive—can be performed for example by excitation with electromagnetic radiation. In particular, the excitation is performed by UV light, whereby also other light sources, such as e.g. IR lamps, lasers, or theoretically also electron radiation or radioactive radiation are possible, whereby the latter two methods in the scope of the invention are not the preferred embodiment variants, as they consist of radiation which is problematic to handle in the field of ink jet printers. Examples of UV photoinitiators are various phenones (e.g. various acetophenones, 2-hydroxy-2-methylpropiophenone, various benzophenones, etc.), Irgacure®, various benzoins, etc., which are known from the prior art. Examples of IR initiators are azobisisobutyronitrile, 1,1'-azobis(cyclohexanecarbonitrile), t-butyl hydroperoxide, m-chloroperbenzoic acid, dibenzoylperoxide, di-t-butyl peroxide, etc., which are also known from the prior art.

Figure 3:
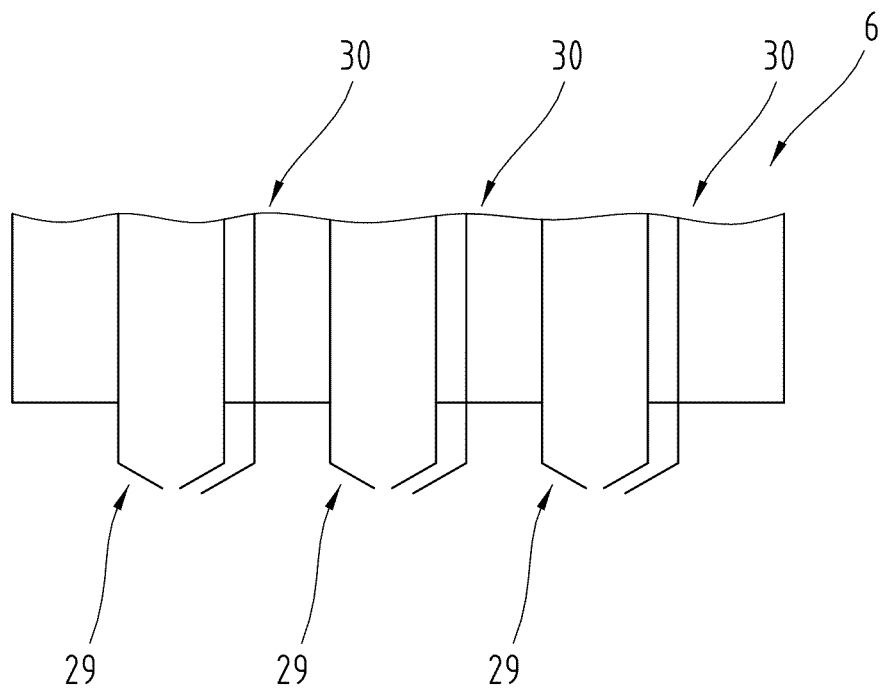
FIG. 3 shows a detail of a print head in the region of the delivery elements in side view.

In the preferred embodiment variant of the invention, the electromagnetic radiation is supplied as shown in FIG. 3. Each print head 6 comprises a plurality of delivery elements 29, for example in the form of nozzles. To introduce electromagnetic radiation into the ink drops, preferably a light source 30 is assigned to each delivery element 29, whereby preferably a lower end of the light source 30 points in the direction of an outlet opening of the delivery element 29. Such light sources 30 are formed in particular by light conductors, which are connected to a primary light source, from which for example UV light is radiated.

It is also possible however that other light sources are used, for example corresponding diodes, which are arranged preferably in the immediate vicinity of the outlet opening of the outlet elements 29. If necessary also several outlet elements 29 can be combined and have a common light source 30. Furthermore, it is possible that if the method according to the invention is not performed in the single pass through, i.e. with a single passage of the substrate to be printed performed below the print heads 6, a scanning mode is performed, i.e. with a print head 6 movable perpendicular to the advancing direction 4, wherein the light source 30 can also be moved at right angles in the same direction and follows the print head 6.

It is also possible within the scope of the invention that the oligomerization or polymerization of the molecules of the additive is performed by other reaction-triggering factors, for example by the reaction of the additive with the environmental atmosphere, in particular humidity (e.g. by sol-gel reactions, etc.). Likewise it is possible within the scope of the invention that the molecules of the additive already comprise a photoinitiator group.

As already mentioned it is also possible that to fix the ink drop on the substrate surface the viscosity of said ink drop is increased after the application, before an additional ink drop of a different color is applied to generate the mixed colors on said ink drop. In addition, to each print head 6 or each row of print heads 26 a heating device 31 is assigned, in particular, arranged downstream of the latter in advancing direction 4, as shown by a dashed line in FIG. 2, in order to achieve by means of an increase in temperature the partial damping of the carrier fluid. Thus said heating devices 31 are arranged between two print heads 6 or rows of print heads 26—with the exception of the last print head 6 or last row of print heads 26 in advancing direction 4. However, it is also possible that said heating devices 31 are assigned directly to the delivery elements 29, as shown in FIG. 3, so that thus each delivery elements 29 or a group of delivery elements 29 has such a heating device 31. The heating device 31 is designed to release heat radiation or warm air. Examples of this are infrared lamps, electrical heating devices, etc. However, it is also possible within the scope of the invention that the increase of viscosity in the ink drop is performed by means of air drying, for example in that an air jet is blown over the ink drop, in order to evaporate a portion of the carrier fluid. In this case the heating device 31 can be omitted.

Of course, it is possible within the scope of the invention to also have a combination of the heating device 31 and light sources 30, so that both elements can be provided in the print head arrangement 5. It is possible if necessary that the heating device 31 is combined with the light source 30, for example if the oligomerization or polymerization is triggered by heat or an increase in temperature, so that additional light sources 30 can be omitted, or if the light source 30 gives off heat at the same time, for example in the form of infrared radiation.

In all of the embodiment variants of the invention it is the case that the ink drops are not fixed so far and their viscosity is not increased so far that the latter are completely set. The ink drops should have a certain residual fluidity, so that a mixture of ink drops printed on top of one another of different colors is possible prior to firing, which is usually performed in a temperature range of between 400° C. and 700° C., whereby the advantage is achieved that more homogenous mixed colors can be generated. In addition, it can be provided within the scope of the invention that the (photo)oligomerizable or (photo)polymerizable additive is simply oligomerized or polymerized to a maximum of 90% or to the aforementioned maximum extent. However, it is also possible that only a proportion of the carrier fluid a maximum of 20%, relative to the total proportion of the carrier fluid on the ink drop, is removed, before the next ink drop is applied onto said drop. Reference is made here to the aforementioned preferred proportions.

It is also possible that the carrier fluid itself at least partly forms the oligomerizable or polymerizable additive. Examples of such carrier fluids are polypropylene glycol diacrylate, epoxy-functionalized propylene or ethylene glycols, long-chain hydrocarbons with epoxy or (meth)acrylic end groups, etc.

According to another embodiment variant it is the case that the primary process color inks are provided with different carrier fluids, whereby said carrier fluids have different boiling points. In this case it is an advantage if the carrier fluid, which has the highest boiling point of the carrier fluids, is added to the ceramic process color ink, which as viewed in advancing direction 4, is applied first, and the additional ceramic process color inks respectively comprise carrier fluids, which respectively comprise gradually lower boiling points. It is thus achieved that the carrier fluids evaporate at different temperatures or that the proportion of carrier fluid on the first applied ink drop is retained over a longer time period, i.e. over a longer distance, as viewed in advancing direction 4, whereby the mixing with the additional ink drop applied thereon can be performed more effectively. Over the entire distance, as viewed in advancing direction 4, said first ink drop passes in sequence through several heating devices 31, so that the proportion of carrier fluid on said ink drop is reduced gradually. Preferably, the reduction of carrier fluid is performed generally, so far that once the printing process itself has been completed the proportion of carrier fluid in the respective ink drop mixture is so low that during the subsequent firing process there can be no formation of bubbles or only a minimum formation of the latter, wherein said formation of bubbles does not disrupt the firing process itself and thus no air is included in the print layer itself.

It is also possible that the carrier fluid consists of a mixture of fluids, such as for example (poly)ethylene glycols, (poly)propylene glycols, glycerin, long and short-chain hydrocarbons, alcohols (propanol, butanol, pentanol, propane diol, ethane diol, etc.), cyclopentanone, cyclohexanone, butanone, acetic acid esters, fatty acid esters, phenoxypropanols, etc., which have a different boiling point, whereby in turn the same effect can be achieved.

Preferably, the total proportion of (photo)oligomerizable or (photo)polymerizable additives in the respective primary ceramic process color ink is selected from a range with a lower limit of 5 wt. % and an upper limit of 70 wt. % or from the aforementioned ranges. The total proportion of photoinitiators in the respective primary ceramic process color ink can be selected from a range with a lower limit of 0.5 wt. % and an upper limit of 20 wt. % or from the aforementioned ranges therefor.

The proportion of carrier fluid in the primary ceramic process color ink can be selected from a range with a lower limit of 30 wt. % and an upper limit of 90 wt. % or the aforementioned ranges therefor.

Provided that the primary ceramic process color inks have different proportions of carrier fluids the difference in carrier fluid can be between 5% and 60%, relative to the respective process color ink with the higher proportion of carrier fluid.

It is fully sufficient within the scope of the invention if the respective color layer, i.e. the respective ink drop is changed only on the surface with respect to its viscosity, as in this way a sufficient fixing of the ink drop on the respective substrate can be achieved. In this way a surface area with a layer thickness of 10% to 60%, relative to the total maximum diameter of the ink drop, can be changed with respect to its viscosity.

During the firing process organic components are evaporated as already known so that the respective ink drops are finally set.

Thus by means of the method according to the invention there can be a controlled drying of each applied color layer, formed by the ink drops during the printing itself, i.e. immediately after the printing and before the respective following color is printed and not only after printing the entire surface with color.

The amount of carrier means evaporating in stages and the speed of the evaporation and the removal of thus produced gases—corresponding suction devices can be provided on the device 1—is defined in particular so that in the subsequent firing process the formation of bubbles is avoided which is caused by the residual evaporating carrier materials which have been evaporated too quickly by the heat of the firing process. In addition, as already mentioned the amount and the duration of the dissipation of the carrier material on the glass or the firing temperature can be adjusted for example at a temperature of 400° C. to 700° C. In particular, the firing process is performed in a controlled manner so that organic components of the process color inks evaporate without the formation of bubbles and structure applied to the ceramic surface or glass, the applied pattern or image etc., melts but remains unchanged in its design.

The carrier fluid itself can be an alcohol, as described above.

In the following several preferred examples of the process color inks according to the invention are described. Owing to the numerous possibilities for designs according to the invention by way of example several examples are given here, as otherwise the scope of this description would be exceeded. The respective proportions of the individual components correspond to the above explanations.

The exemplary embodiments thus show only some embodiment variants, whereby it should be noted at this point that the invention is not restricted to the embodiment variants shown in particular, but rather various different combinations of the individual embodiment variants are also possible. This variability, due to the teaching on technical procedure in the present invention, lies within the ability of a person skilled in the art in this technical field.

Example 1

A black firable process color ink consisting of the carrier fluids polypropylene glycol diacrylate, high molecular polyethylene glycol and 1,2-propane diol, the pigments $CoCr_2O_4$, $CuCr_2O_4$ and $CO_3O_4$, the frit material $Bi_2O_3$, viscosity regulators and the photoinitiator Irgacure 819® was printed by the described method onto glass and fixed by UV-light. The applied and prefixed process color ink was fired at a temperature of 700° C.

Example 2

A black firable process color ink consisting of the carrier fluids polypropylene glycol diacrylate, high-molecular polyethylene glycol and 1,2-propane diol, the pigments $CoCr_2O_4$, $CuCr_2O_4$ and $CO_3O_4$, the frit material $Bi_2O_3$, viscosity regulators and the thermal initiator 1,1'-azobis(cyclohexanecarbonitrile) was printed by the described method on glass and fixed by means of an IR element. The applied and prefixed process color ink was fired at a temperature of 650° C. to 700° C.

Example 3

A blue firable process color ink consisting of the carrier fluids polypropylene glycol diacrylate, epoxy-functionalized polyethylene glycol and hexane diol, the pigment $CoAl_2O_4$, a frit material with acrylate-functionalities (obtained by a silanization reaction of the frit material), viscosity regulators and the UV initiator 2-hydroxy-2-methyl propiophenone was printed by the described method onto glass and onto ceramic elements and fixed by means of UV emitters. The applied and prefixed process color ink was fired at a temperature of 650° C. to 700° C.

Example 4

A black firable process color ink consisting of the carrier fluids polypropylene glycol diacrylate, high-molecular polyethylene glycol, cyclohexane, butanone and a mixture of different hydrocarbons, the pigments $Fe_3O_4$ and $FeCr_2O_4$, the frit material $Bi_2O_3$, viscosity regulators and the photoinitiator Irgacure 819® was printed in the described method on glass and fixed by a combination of thermal processing and UV light. The applied and prefixed process color ink was fired at a temperature of 700° C.

The exemplary embodiments show possible embodiment variants of the device 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the device 1 the latter and its components have not been represented true to scale in part and/or have been enlarged and/or reduced in size.

The invention claimed is:

1. A method for producing a multicolored surface on a ceramic element or glass by the drop-like application of differently colored primary ceramic process color inks containing a carrier fluid onto at least a portion of a surface of the ceramic element or glass, the method comprising: adding at least one (photo)oligomerizable or (photo)polymerizable additive to the primary ceramic process color inks; printing on top of one another at least two primary ceramic process color inks to obtain a mixed color ink; and subsequently firing the applied ink drops; wherein prior to overprinting an ink drop with an additional ink drop the ink drop is at least partly set and/or the viscosity of the ink drop is increased.

2. The method of claim 1, wherein the (photo)oligomerizable or (photo)polymerizable additive of the ink drop is only partly oligomerized or polymerized prior to the application of a further ink drop thereon.

3. The method of claim 2, wherein the (photo)oligomerizable or (photo)polymerizable additive is oligomerized or polymerized up to a maximum extent of 90%.

4. The method of claim 1, further comprising removing a maximum of 20% of the carrier fluid in the ink drop before a next ink drop is applied onto said ink drop.

5. The method of claim 1, wherein said carrier fluid is an oligomerizable or polymerizable carrier fluid which is oligomerized or polymerized in the ink drop after the application of the ink drop.

6. The method of claim 1, wherein the ceramic element or glass is printed in a single pass by a printing device, wherein in the printing device a plurality of delivery elements are arranged behind one another for respectively printing one of the primary ceramic process color inks as viewed in the advancing direction of the ceramic element or the glass, and wherein the carrier fluid of the primary ceramic process color inks is removed only partly from the ink drops after application and before another ink drop is applied onto the same spot.

7. The method of claim 1, wherein for at least two of the primary ceramic process color inks respectively a carrier fluid is used which can evaporate at different temperatures.

8. The method of claim 1, wherein said carrier fluid consists of a mixture of fluids with different boiling points.

9. The method of claim 1, comprising using an inkjet printer to print the ceramic element or glass.

10. The method of claim 1 wherein at least one photoinitiator is added to the primary ceramic process color inks.

* * * * *